Dec. 16, 1952          I. J. ZIEGLER          2,621,938
COLLET CHUCK APPARATUS
Filed Sept. 10, 1948          2 SHEETS—SHEET 1
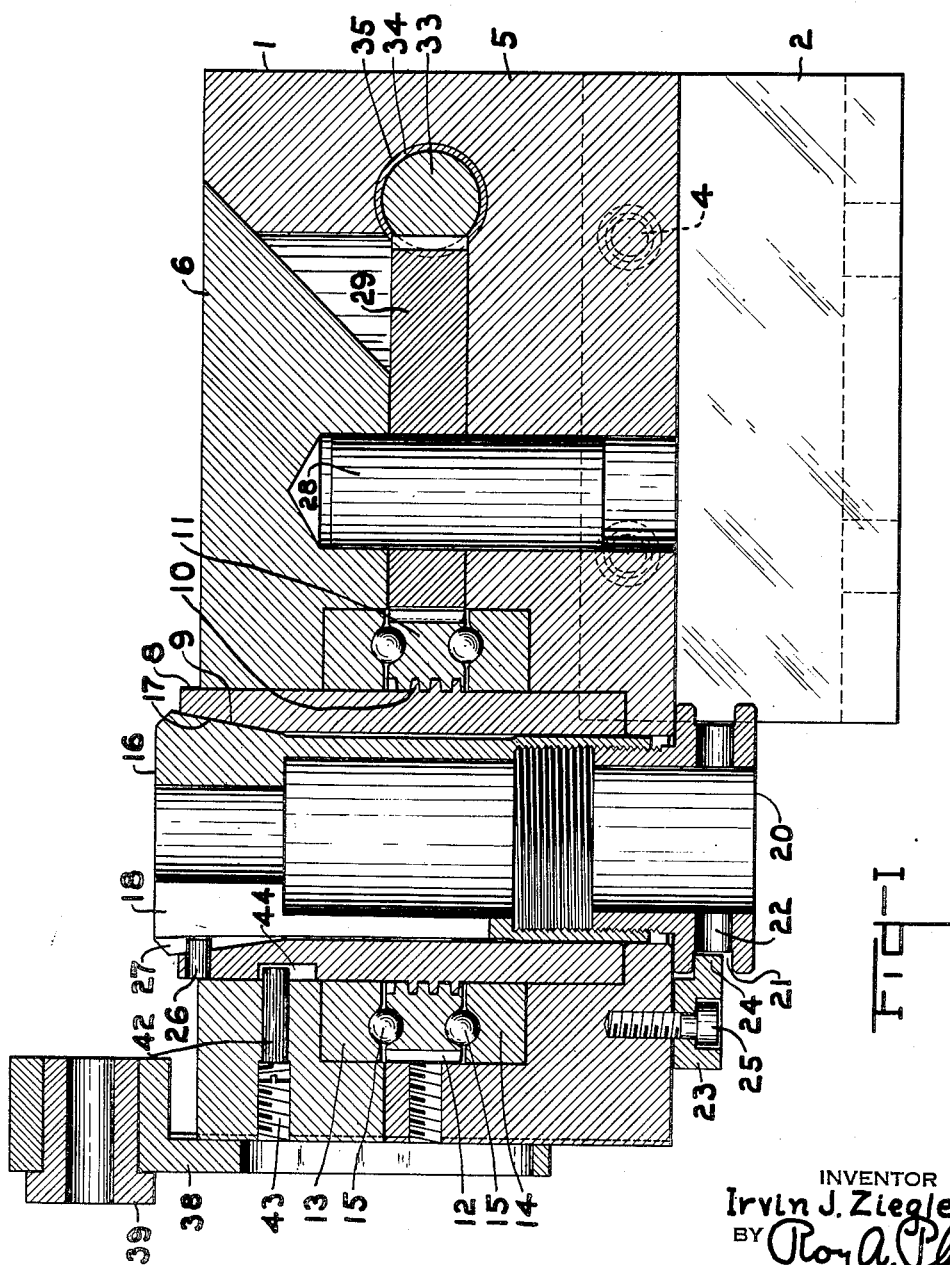
INVENTOR
Irvin J. Ziegler
BY Roy A. Plant
ATTORNEY Dec. 16, 1952     I. J. ZIEGLER     2,621,938
COLLET CHUCK APPARATUS
Filed Sept. 10, 1948     2 SHEETS—SHEET 2
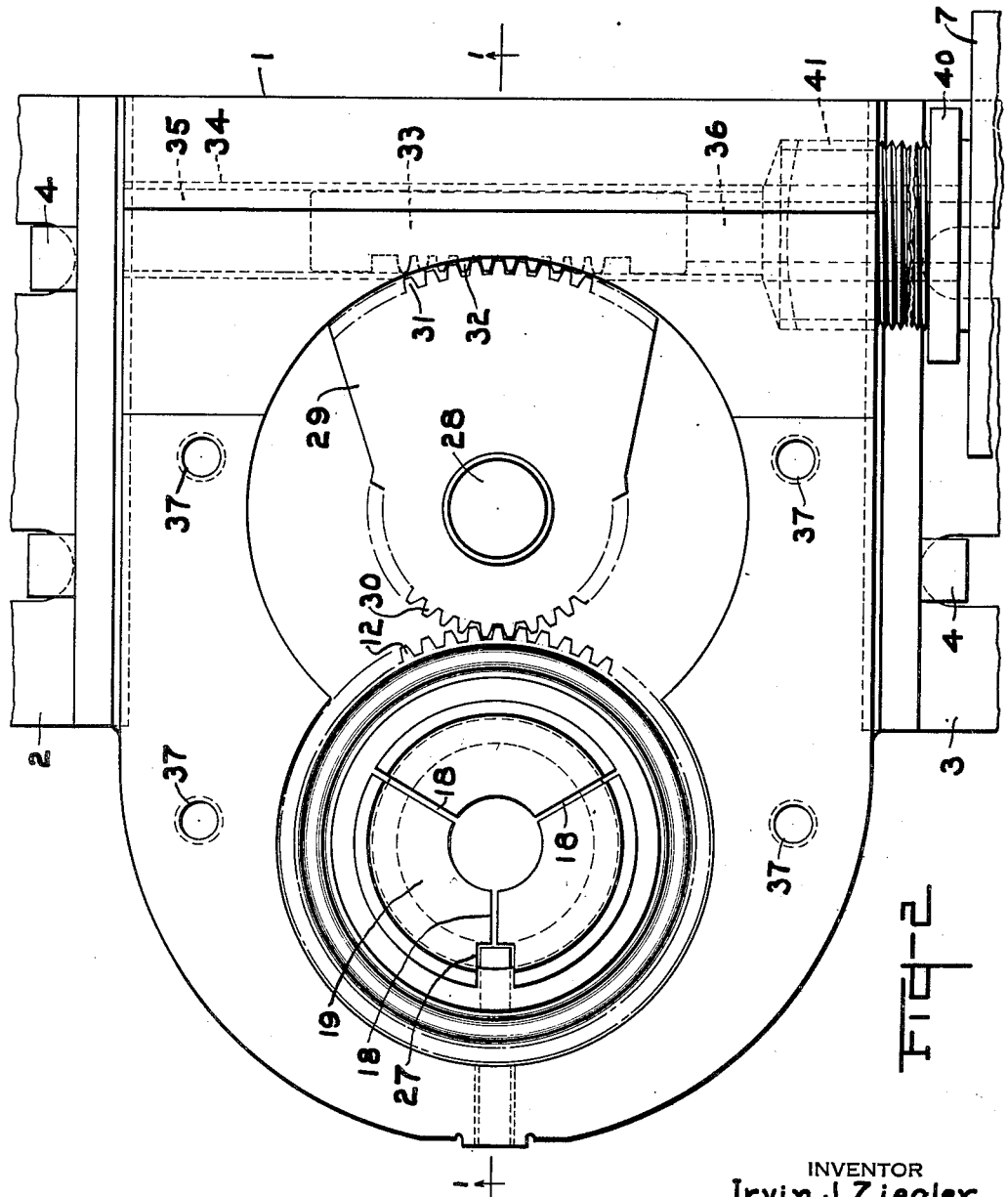
INVENTOR
Irvin J. Ziegler
BY Roy A. Plant
ATTORNEY Patented Dec. 16, 1952

2,621,938

UNITED STATES PATENT OFFICE 2,621,938

COLLET CHUCK APPARATUS

Irvin J. Ziegler, Jackson, Mich., assignor to G & Z Automatic Products Company, Jackson, Mich., a corporation of Michigan Application September 10, 1948, Serial No. 48,710

14 Claims. (Cl. 279—50)

The present invention relates broadly to workpiece holding apparatus, and in its specific phases to an assembly including a non-rising collet chuck and means for actuating same.

Commercially used collet assemblies universally involve rising collets. That type of collet apparatus is subject to the difficulty that a small variation in size of the stock to be gripped and held by the collet will vary the amount of rising of the collet and hence this makes it difficult to hold lengthwise dimensions to close tolerances. The commonly used collets only have moderately strong holding power on the part to be machined and this limits them so far as withstanding severe types of machining is concerned. All types of collet apparatus now commercially in use also lose their grip on the part being machined the moment that the applied gripping pressure is released and even before collet opening pressure is applied. It was a recognition of these shortcomings of the prior art now commercially in use which led to the conception and development of the present invention.

Accordingly among the objects of the present invention is the provision of a collet chuck assembly wherein the collet is of the non-rising type.

Another object is to provide the collet chuck assembly with an endwise movable sleeve to actuate the collet which is held rigidly against endwise movement.

Another object is to provide an endwise movable sleeve and a non-rising collet, wherein the sleeve is free to slide on the collet but not to rotate relative to same.

Another object is to provide a collet chuck assembly with an endwise movable sleeve having external circumferential threads, and an annular nut fitting said threads, with said nut being held against endwise movement and having gear teeth cut on its outer face.

Another object is to provide a pivotally mounted toothed means which has one portion meshing with the teeth on the annular nut, and another portion meshing with a rack which is actuated by any suitable operating mechanism.

Another object is to make the intermediate member of the collet actuating assembly in the form of a double segmental gear having segments of different radius to provide lever action.

Another object is to provide a separable housing for the apparatus to facilitate assembling and disassembling of the meshing parts of the collet assembly.

Another object of the invention is to provide means for locking the collet of the collet chuck against endwise motion while leaving same free for contraction and expansion in the gripping and releasing of a workpiece.

Another object is to provide a collet chuck apparatus wherein the collet may be removed and replaced without releasing the assembly from the table or base on which it is mounted.

Another object is to provide a collet chuck assembly which, while small, is of heavy duty construction with extreme gripping pressure which firmly holds the workpiece even though operating pressure fails since releasing pressure is necessary before the workpiece can be removed.

A further object is to provide a collet chuck assembly which may be mounted in any position and is adapted for various machining operations such as turning, boring, cross drilling, and milling.

Another object is to provide a collet chuck apparatus which is adapted to be used as a chuck for holding standard collets, a thing which will increase its versatility.

A further object is to provide a collet chuck which is simple in construction, readily manufactured with close tolerances, and easy to use.

Still further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

Figure 1 shows a vertical section view through a preferred form of the present invention as taken at line 1—1 of Figure 2 looking in the direction of the arrows.

Figure 2 shows a top view of the assembly illustrated in Figure 1, but with the top member and top ball race of same removed to show the inner working parts.

Referring more particularly to the drawings, it will be noted that the collet chuck assembly 1 is mounted on a pair of bracket members 2 and 3 by means of cap screws 4. The body of this collet assembly consists of a bottom member 5 and a top member 6. Mounted on the bottom member for actuating the collet assembly is any suitable source of actuating force such as a double acting air cylinder assembly 7, Figure 2.

Bottom member 5 and top member 6 are bored in alignment for a close but sliding fit with sleeve 8, which is provided with an internally tapered face 9 at its upper end, and with a plurality of projecting threads 10 on its outer surface. These threads are preferably of the double acme type to give strength as well as a relatively rapid incline to the thread. Threadedly engaging the threads on sleeve 8 is an internally threaded ring member 11 which is longer than the threads on sleeve 8 and provided with gear teeth 12 on its outer periphery for a purpose to be hereinafter described. The top and bottom faces of ring member 11 are grooved for the reception of bearing balls 15, while upper and lower ball races 13 and 14 are correspondingly grooved for these balls. Bottom member 5 and top member 6 of the collet chuck assembly are also counterbored concentric with the bore for sleeve 8 and of a sufficient size to operably receive ball races 13 and 14 as well as ring member 11.

Fitting inside of sleeve 8 is a collet 16, the upper end of which is provided with an externally tapered face 17 adapted to fit the internally tapered face 9 of sleeve 8. This collet has its upper end provided with a plurality of lengthwise slits 18 which in one preferred construction will provide three segments 19, as shown in Figure 2, with these slits in preferred construction extending down approximately ⅔ the length of the collet. The lower end of collet 16 has an outside diameter forming a close sliding fit with sleeve 8, and the lower portion of the bore in bottom member 5. Collet 16 is internally threaded at its lower end for engagement with an externally threaded sleeve member 20 which is flanged at its lower end for engaging against the bottom of bottom member 5. This sleeve member is provided with a circumferential groove 21 and spanner wrench radial openings 22 for tightening same in desired amount. Sleeve member 20 is held in adjusted position by means of a clamping dog 23 which has an extending ear 24 which engages groove 21 in sleeve member 20 to grip the latter against the bottom face of bottom member 5 when cap screw 25 is tightened. This construction anchors collet 16 against endwise movement as well as rotation.

At the upper end of sleeve 8 is mounted an inwardly projecting pin 26 which slidably fits enlargement 27 in the outer portion of one of the lengthwise slits 18 of collet 16. This construction guides sleeve 8 in an endwise direction when internally threaded ring member 11 is rotated thereon.

Mounted on a pivot pin 28, which fits a second aligned opening in bottom and top members 5 and 6 of the assembly, is a segmental gear member 29 which has teeth 30 at one edge meshing with the gear teeth 12 on ring member 11. At the opposite edge of segmental gear member 29 is another set of gear teeth 31 which mesh with teeth 32 on rack member 33 which slidably fits bushing 34 in bore 35 of bottom member 5. Rack member 33 forms a continuation of piston rod 36 connected to the piston (not shown) of double acting cylinder 7, which is mounted on bottom member 5 by means of an externally threaded extension 40 which threadedly engages a suitable opening 41 in bottom member 5. In final assembled position, top member 6 may be fastened to bottom member 5 in conventional manner such as by means of cap screws (not shown) extending through drilled openings 37, Figure 2, in bottom member 5 and engaging aligned threaded openings (not shown) in top member 6.

This chuck assembly is adapted for holding the workpiece for machining in various ways, one of which is cross drilling. This drilling may be handled, for instance, by means of drill jig member 38, Figure 1, carrying drill guide bushing 39.

To operate the apparatus, rack 33, Figure 2, is first moved to its lowermost position since this lowers sleeve 8 and allows collet 16 (together with any suitable standard collet carried therein) to expand to open position. The workpiece is then placed in the collet in desired position and air admitted to cylinder 7 to move rack 33 upward, thus moving segmental gear member 29 in counter-clockwise direction and rotating ring gear 11 clockwise. This ring gear, through its engagement with projecting threads 10 on sleeve 8, moves the latter upwardly so that its tapered face engages the taper face 17 of collet 16 to shrink the size of the inner opening of the latter and grip the workpiece to be machined. At the end of the machining operation, air is admitted in conventional manner to the opposite end of cylinder 7 to move the parts in reverse direction and release the workpiece for removal, which thus leaves the collet chuck assembly ready for operation on the next piece to be machined.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

1. A workpiece holding apparatus, which comprises a housing, an endwise movable sleeve fitting said housing, means for guiding said sleeve in a non-rotating endwise direction, a collet fitting into said sleeve, means for anchoring said collet against endwise movement, means joining said sleeve to said collet and limiting said sleeve to endwise movement relative to said collet, means for reversibly moving said sleeve in endwise direction, and means for actuating said collet when said sleeve is moved in endwise direction.

2. A workpiece holding apparatus, which comprises a housing, a non-rotatable but endwise movable sleeve fitting said housing, a collet fitting into said sleeve, means for anchoring said collet against endwise movement, and means for reversibly moving said sleeve in endwise direction to operate said collet, said means including external threads on said sleeve, a ring nut threadedly fitting the threaded portion of said sleeve, means for holding said ring nut substantially against endwise movement while leaving same free to rotate, and means for reversibly rotating said ring nut.

3. A workpiece holding apparatus, which comprises a housing, an endwise movable sleeve fitting said housing, a collet fitting into said sleeve, means for anchoring said collet against endwise movement, means for reversibly moving said sleeve in endwise direction, means for actuating said collet when said sleeve is moved in endwise direction, said sleeve having an externally threaded portion, a ring nut threadedly fitting said threaded portion of said sleeve and being longer than the threads on the latter, means for holding said ring nut substantially against endwise movement while leaving same free to rotate, and rack including means for rotating said ring nut.

4. The combination with a collet chuck assembly which has a non-rising collet which is anchored at one end and an endwise slidable sleeve having an externally threaded portion and adapted for slidably fitting and operating said collet, of a ring nut threadedly engaging said threaded portion of said sleeve and provided with engageable means for rotating said nut on said sleeve, and means for holding said nut against substantial endwise displacement relative to said collet during rotation of said nut on said sleeve.

5. A collet chuck assembly which consists of a housing, an endwise movable sleeve fitting said housing, a collet fitting into said sleeve, means for anchoring said collet against endwise movement, means joining said sleeve to said collet for endwise movement of the former on the latter, said sleeve having an externally threaded portion, a ring nut threadedly engaging the threads on said sleeve and longer than the threads on the latter, said ring nut having teeth on its outer face, a rack, a segmental gear operably engaging the teeth on said ring nut and said rack, a pivot mounting for said segmental gear, means for operably actuating said rack, and cooperating taper means on the upper end of said collet and sleeve for operating said collet when said sleeve is moved in endwise direction.

6. A collet chuck type of workpiece holding apparatus, which comprises a housing, an endwise movable sleeve fitting said housing, means for guiding said sleeve in non-rotating endwise direction, a collet fitting into said sleeve, means for anchoring said collet against endwise movement, means joining said sleeve to said collet and limiting said sleeve to endwise movement relative to said collet, means for reversibly moving said sleeve in endwise direction, means for actuating said collet when said sleeve is moved in endwise direction, said means for reversibly moving said sleeve in endwise direction comprising external threads on said sleeve, a ring nut threadedly fitting said threaded portion of said sleeve, and means for reversibly rotating said ring nut on the threaded portion of said sleeve to move the latter endwise and thus actuate said collet.

7. A collet chuck type of workpiece holding apparatus, which comprises a housing, an endwise movable sleeve fitting said housing, means for guiding said sleeve in non-rotating endwise direction, a collet fitting into said sleeve, means for anchoring said collet against endwise movement, means joining said sleeve to said collet and limiting said sleeve to endwise movement relative to said collet, means for reversibly moving said sleeve in endwise direction, means for actuating said collet when said sleeve is moved in endwise direction, said collet having an external taper on its upper portion, and said sleeve having an internal tapered portion engaging said external taper of said collet for actuating the latter when said sleeve is moved in endwise direction.

8. A collet chuck type of workpiece holding apparatus, which comprises a housing, an endwise movable sleeve fitting said housing, means for guiding said sleeve in non - rotating endwise direction, a collet fitting into said sleeve, means for anchoring said collet against endwise movement, means joining said sleeve to said collet and limiting said sleeve to endwise movement relative to said collet, means for reversibly moving said sleeve in endwise direction, means for actuating said collet when said sleeve is moved in endwise direction, said collet having an external taper on its upper end, a cooperating internal tapered portion on said sleeve for engaging the tapered portion of said collet for actuating the latter when said sleeve is operably moved in endwise direction, and means for guiding said sleeve in substantially straight line non-rotary path on said collet, said means for reversibly moving said sleeve in endwise direction including an externally threaded portion on said sleeve, a ring nut threadedly fitting said threaded portion of said sleeve, and means for reversibly rotating said ring nut.

9. A collet chuck type of workpiece holding apparatus, which comprises a housing, an endwise movable sleeve fitting said housing, means for guiding said sleeve in non-rotating endwise direction, a collet fitting into said sleeve, means for anchoring said collet against endwise movement, means joining said sleeve to said collet and limiting said sleeve to endwise movement relative to said collet, means for reversibly moving said sleeve in endwise direction, means for actuating said collet when said sleeve is moved in endwise direction, said collet and sleeve having interengaging pin and groove means for guiding them in a substantially straight line non-rotary path relative to each other, said collet having an outwardly flared external taper on its upper end, and said sleeve having an outwardly flared internal taper on its upper end in operative engagement with the external taper of said collet, said means for reversibly moving said sleeve in endwise direction including an externally threaded portion on said sleeve, a ring nut threadedly fitting said threaded portion of said sleeve, and means for reversibly rotating said ring nut.

10. A collet chuck type of workpiece holding apparatus, which comprises a housing, an endwise movable sleeve fitting said housing, means for guiding said sleeve in non-rotating endwise direction, a collet fitting into said sleeve, means for anchoring said collet against endwise movement, means joining said sleeve to said collet and limiting said sleeve to endwise movement relative to said collet, means for reversibly moving said sleeve in endwise direction, means for actuating said collet when said sleeve is moved in endwise direction, said means for reversibly moving said sleeve in endwise direction including a rack and a toothed mechanism operably connecting said rack to said sleeve, and means for reversibly moving said rack.

11. A collet chuck type of workpiece holding apparatus, which comprises a housing, an endwise movable sleeve fitting said housing, means for guiding said sleeve in non-rotating endwise direction, a collet fitting into said sleeve, means for anchoring said collet against endwise movement, means joining said sleeve to said collet and limiting said sleeve to endwise movement relative to said collet, means for reversibly moving said sleeve in endwise direction, means for actuating said collet when said sleeve is moved in endwise direction, said means for reversibly moving said sleeve including a rack member operably connected to said sleeve through a pivotally mounted segmental gear and a ring nut threadedly engaging said sleeve and having teeth on its outer face for engaging said segmental gear, and a double acting fluid operated cylinder for reversibly moving said rack.

12. In a non-rising collet chuck assembly having a collet actuated through a non-rotatable but endwise movable sleeve, said collet and sleeve having a cooperating taper means for actuating said collet when said sleeve is moved in endwise direction, the combination therewith of means for moving said sleeve in endwise direction, said means including a pivotally mounted segmental gear.

13. In a non-rising collet chuck assembly wherein the collet is actuated through a non-rotatable but endwise movable sleeve, said collet and sleeve having a cooperating taper means for actuating said collet when said sleeve is moved in endwise direction, a means for moving said sleeve in endwise direction, said means including an externally threaded portion of said sleeve, a ring nut threadedly engaging said threaded portion of said sleeve, said ring nut having teeth on its outer face, means for holding said nut against substantial endwise displacement relative to said collet during rotation of said nut on said sleeve, a segmental gear operably engaging the teeth on said ring nut, a pivot mounting for said segmental gear, and means for imparting reversible rotary movement to said segmental gear, said means including a toothed member in engagement with teeth on said segmental gear.

14. In a non-rising collet chuck assembly having a fixed position collet actuated through a non-rotatable but endwise movable sleeve, said collet and sleeve having a cooperating taper means for actuating said collet when said sleeve is moved in endwise direction, the combination therewith of means for moving said sleeve in endwise direction, said means including external threads on said sleeve, a ring having gear teeth on an outer face thereof and internal threads threadedly engaging the threads on said sleeve, a pivotally mounted double segmental gear, the gear teeth of one of said segments engaging the teeth on said ring, and a rack means operatively engaging the teeth on the outer segment of said double segmental gear, whereby actuation of said rack means will operate said collet.

IRVIN J. ZIEGLER.

REFERENCES CITED

The following references are of record in the file of this patent:

UNITED STATES PATENTS

| Number | Name | Date |
|---|---|---|
| 1,094,346 | Schellenbach | Apr. 21, 1914 |
| 1,320,113 | Bemis | Oct. 28, 1919 |
| 2,359,507 | Bell | Oct. 3, 1944 |
| 2,429,617 | Gustafson | Oct. 28, 1947 |
| 2,431,594 | Wernig | Nov. 25, 1947 |